United States Patent
Wang et al.

(10) Patent No.: US 9,086,735 B2
(45) Date of Patent: Jul. 21, 2015

(54) EXTENSION FRAMEWORK FOR INPUT METHOD EDITOR

(75) Inventors: Yong-Gang Wang, Beijing (CN); Liangyi Ou, Beijing (CN); Yinfei Zhang, Shanghai (CN)

(73) Assignee: Google Inc., Mountain View, CA (US)

( * ) Notice: Subject to any disclaimer, the term of this patent is extended or adjusted under 35 U.S.C. 154(b) by 600 days.

(21) Appl. No.: 13/142,746

(22) PCT Filed: Apr. 12, 2010

(86) PCT No.: PCT/CN2010/071691
§ 371 (c)(1),
(2), (4) Date: Jun. 29, 2011

(87) PCT Pub. No.: WO2011/127640
PCT Pub. Date: Oct. 20, 2011

(65) Prior Publication Data
US 2012/0041752 A1    Feb. 16, 2012

(51) Int. Cl.
*G06F 17/20* (2006.01)
*G06F 17/21* (2006.01)
(Continued)

(52) U.S. Cl.
CPC ............. *G06F 3/0237* (2013.01); *G06F 3/018* (2013.01); *G06F 9/4448* (2013.01); *G06F 9/45512* (2013.01); *G06F 17/21* (2013.01)

(58) Field of Classification Search
CPC ....... G06F 3/0237; G06F 17/21; G06F 3/018; G06F 9/4448; G06F 9/45512
USPC .......................................... 704/2, 8; 715/255
See application file for complete search history.

(56) References Cited

U.S. PATENT DOCUMENTS

| 8,543,375 B2 | 9/2013 | Hong | |
|---|---|---|---|
| 2003/0212563 A1* | 11/2003 | Ju et al. | ............ 704/277 |

(Continued)

FOREIGN PATENT DOCUMENTS

| CN | 101286093 A | 10/2008 |
|---|---|---|
| CN | 101286094 A | 10/2008 |

(Continued)

OTHER PUBLICATIONS

PCT International Search Report and Written Opinion dated Jan. 20, 2011 for PCT International Application No. PCT/CN2010/071691, 9 pages.

(Continued)

*Primary Examiner* — Angela A Armstrong
(74) *Attorney, Agent, or Firm* — Remarck Law Group PLC

(57) ABSTRACT

Implementations of the present disclosure provide an input method editor (IME) extension framework for extending the functionality of (IMEs). In some implementations, a user input into a user interface of an (IME) is received and is provided to a script engine. A script is selected from a plurality of scripts electronically stored in a script repository. The user input is processed through the script using the script engine to generate one or more candidates, and the one or more candidates are provided to an (IME) engine. In some implementations, a script file is received, the script file being executable by an (IME) system to generate one or more candidates based on a user input into the (IME) system. The script file is electronically stored in a central registry, the central registry including a plurality of scripts, and the plurality of scripts are published for download to and installation on a user device, the user device including the (IME) system.

49 Claims, 6 Drawing Sheets

(51) Int. Cl.
*G06F 17/28* (2006.01)
*G06F 3/023* (2006.01)
*G06F 3/01* (2006.01)
*G06F 9/44* (2006.01)
*G06F 9/455* (2006.01)

(56) References Cited

U.S. PATENT DOCUMENTS

| | | |
|---|---|---|
| 2007/0226773 A1* | 9/2007 | Pouliot .............................. 726/1 |
| 2010/0125829 A1* | 5/2010 | Lee et al. ....................... 717/116 |
| 2011/0173172 A1 | 7/2011 | Hong et al. |

FOREIGN PATENT DOCUMENTS

| | | |
|---|---|---|
| CN | 101286155 A | 10/2008 |
| CN | 101488154 A | 7/2009 |
| JP | 02060658 A | 3/1990 |
| JP | 06266719 A | 9/1994 |
| JP | H07129565 A | 5/1995 |
| JP | 2009223782 A | 10/2009 |
| WO | 2008124730 A | 10/2008 |
| WO | 2008127939 A1 | 10/2008 |
| WO | 2011066434 A2 | 6/2011 |

OTHER PUBLICATIONS

Extended European Search Report dated Oct. 22, 2014 for EP Application No. 10849650.6, 12 pages.
Manappa, N. et al., "Google Transliteration IME Available in Fourteen Languages," Official Google India Blog, Jan. 28, 2010, 1 page.
Sachiko, Y., "Web 2.0 and Their Attack Scheme for Application Measures, Information Processing," Japan, Information Processing Society of Japan, Jan. 15, 2009, vol. 50, No. 1, pp. 44-54.
Shimizu, T., "New Features ATOK Dailekh The Latest Version of ATOK Aimed at Information Portal I Explore the Possibility Bets," PCfan, Japan, Co., Addison-Wesley, Mar. 15, 2008, vol. 15, No. 7, pp. 84-85.

* cited by examiner

```
function Compute(input)
    local func = loadstring(input)
    if func == nil then
        return "-- 未完整表达式 --"
    end
    local ret = func()
    if ret == math.huge then -- div/0
        return "-- 计算错误 --"
    end
    if ret ~= ret then
        -- We rely on the property that NaN is the only value not equal to itself.
        return "-- 计算错误 --"
    end
    return ret
end
ime.register_command("js", "Compute", "计算模式", "none", "输入表达式，例如3*log(4+2)")
```

*FIG. 6A*

| i js 380.22*(sin(7.2)+cos(8)) | 输入表达式，例如3*log(4+2) | ◁ ▷ |

EXTENSION FRAMEWORK FOR INPUT METHOD EDITOR

CROSS-REFERENCE TO RELATED APPLICATIONS

This application is the U.S. national stage under 35 USC §371 of International Application Number PCT/CN2010/071691, filed on Apr. 12, 2010, the disclosure of which is expressly incorporated herein by reference in its entirety.

BACKGROUND

This disclosure relates to input methods.

Languages that use a logographic script in which one or two characters correspond roughly to one word or meaning have more characters than keys on a standard input device, such as a computer keyboard or a mobile device keypad. For example, the Chinese language contains tens of thousands of characters defined by base Pinyin characters and five tones. The mapping of these many-to-one associations can be implemented by input methods that facilitate entry of characters and symbols not found on input devices. Accordingly, a Western-style keyboard or mobile device can be used to input Chinese characters. Likewise, input methods can be used for using a Western style keyboard to input many other languages that include ideograms, such as the Japanese language, the Korean language, and other languages.

An input method editor (IME) can be used to realize an input method. Using the Chinese language as an example, a user can input one or more Pinyin characters, or queries, which are processed by the IME to provide one or more Chinese character candidates. One scenario includes a query-to-candidates mapping function: f(query)=candidates, where a query includes a sequence of ASCII keys and the candidates includes a list of Chinese or non-Chinese strings. Although other input-to-output mappings that map ASCII queries to Chinese or non-Chinese candidates, such mappings are limited in functionality.

SUMMARY

This specification describes technologies relating to input method editors, and an extension framework for input method editors, in particular.

In general, one innovative aspect of the subject matter described in this specification can be embodied in methods that include the actions of receiving a user input into a user interface of an input method editor (IME), providing the user input to a script engine, selecting a script from a plurality of scripts electronically stored in a script repository, processing the user input through the script using the script engine to generate one or more candidates, and providing the one or more candidates to an IME engine.

In some aspects, the actions further include instantiating a sandbox process, the script engine being executed within the sandbox process.

In some aspects, the IME engine communicates with the script engine using inter-process communication.

In some aspects, the actions further include executing an IPC server within the sandbox process, the IPC server enabling communication between the IME engine and the script engine.

In some aspects, the sandbox process restricts functionality of the script engine.

In some aspects, the user input includes an input sequence that identifies the script and an input to be processed by the script.

In some aspects, the actions further include comparing the user input to one or more trigger strings, determining that the user input matches one of the one or more trigger strings, and selecting the script based on the one of the one or more trigger strings.

In some aspects, the actions further include receiving an input indicating operation of the IME in an extension mode, operating the IME in the extension mode in response to receiving the input, and providing all user input to the script engine when operating in the extension mode.

In some aspects, processing the user input through the script includes the actions of establishing a network connection with a web-based service, providing at least a portion of the user input to the web-based service, and receiving a response from the web-based service, the response having been generated based on the at least a portion of the user input, and the one or more candidates including the response. In some aspects, the web-based service includes at least one of a map service, a search service and a translation service.

In some aspects, the actions further include generating a first candidate list including a first set of candidates, generating a second candidate list including a second set of candidates, the second set of candidates including the one or more candidates generated using the script engine, combining at least a portion of the first set of candidates and at least a portion of the second set of candidates to provide a third candidate list, and displaying the third candidate list on the user device.

In some aspects, the IME engine processes the one or more candidates for display on the user interface.

In some aspects, the actions further include receiving second user input indicating a selection of one of the one or more candidates, and inputting the one of the one or more candidates to an application executed on a user device. In some aspects, the application includes one of a word processing application, a text editing application, a spreadsheet application, an email application, a presentation application, and a web browser.

In some aspects, each script electronically stored in the script repository includes one or more routines selected from a plurality of approved routines.

In some aspects, the actions further include identifying a script language of the script, wherein the script engine instantiates a runtime corresponding to the script language for processing the user input through the script.

In some aspects, the user input is provided in a first language. In some aspects, the one or more candidates are provided in the first language. In other aspects, the one or more candidates are provided in a second language. In other aspects, the one or more candidates are provided in a combination of the first language and a second language. In some aspects, the one or more candidates include one or more symbols.

In some aspects, the actions further include receiving input, generating a list of available scripts electronically stored in a central registry in response to the input, the list of available scripts including the script, receiving a second input indicating a selection of the script, retrieving the script from the central registry in response to the second input, and storing the script in the script repository.

Another innovative aspect of the subject matter described in this specification can be embodied in methods that include the actions of receiving a user input into a user interface of an IME, providing the user input to a script engine, selecting a script from a plurality of scripts electronically stored in a script repository, establishing a network connection with a web-based service based on instructions provided in the script, providing at least a portion of the user input to the web-based service, receiving a response from the web-based service, and providing the response to an IME engine to display the response to a user.

In some aspects, the web-based service includes at least one of a map service, a search service and a translation service. In some aspects, the at least a portion of the user input is provided to the map service, and the response is generated by the map service and includes a user selectable hyperlink. In other aspects, the at least a portion of the user input is provided to the search service as a search term, and the response is generated by the search service and includes one or more search results generated by the search service based on the search term. In other aspects, the at least a portion of the user input is provided to the translation service and is provided in a first language, and the response is generated by the translation service and is provided in a second language.

In general, another aspect of the subject matter described in this specification can be embodied in methods that include the actions of receiving a script file, the script file being executable by an IME system to generate one or more candidates based on a user input into the IME system, electronically storing the script file in a central registry, the central registry comprising a plurality of scripts, and publishing the plurality of scripts available for download to and installation on a user device, the user device including the IME system.

In some aspects, each script of the plurality of scripts includes one or more routines selected from a plurality of approved routines.

In some aspects, the scripts of the plurality of scripts are written in one of JavaScript, Lua and VBScript.

In some aspects, at least one script of the plurality of scripts includes associated meta-data, the associated meta-data providing instructions for displaying the one or more candidates. In some aspects, the instructions include providing a number sequence for displaying the one or more candidates in a candidate list. In other aspects, the instructions include providing a letter sequence for displaying the one or more candidates in a candidate list.

The details of one or more implementations of the subject matter described in this specification are set forth in the accompanying drawings and the description below. Other features, aspects, and advantages of the subject matter will become apparent from the description, the drawings, and the claims. Further, aspects of the subject matter described in this specification, including the aspects described above, can be combined in one or more combinations.

DESCRIPTION OF DRAWINGS

FIG. 6A illustrates an example extension corresponding to the command extension mode.

FIG. 6B illustrates an example output based on the extension of FIG. 6A.

Like reference symbols in the various drawings indicate like elements.

DETAILED DESCRIPTION

§1.0 Overview

This specification describes technologies related to an extension framework for input method editors (IMEs). Although example implementations will be described in the context of the English and Chinese languages, the present disclosure is readily applicable to other non-logographic languages (e.g., including German, French, Italian, Spanish, Portuguese, Swedish) and logographic languages (e.g., including Japanese, Korean and/or Indic languages).

Figure 1:
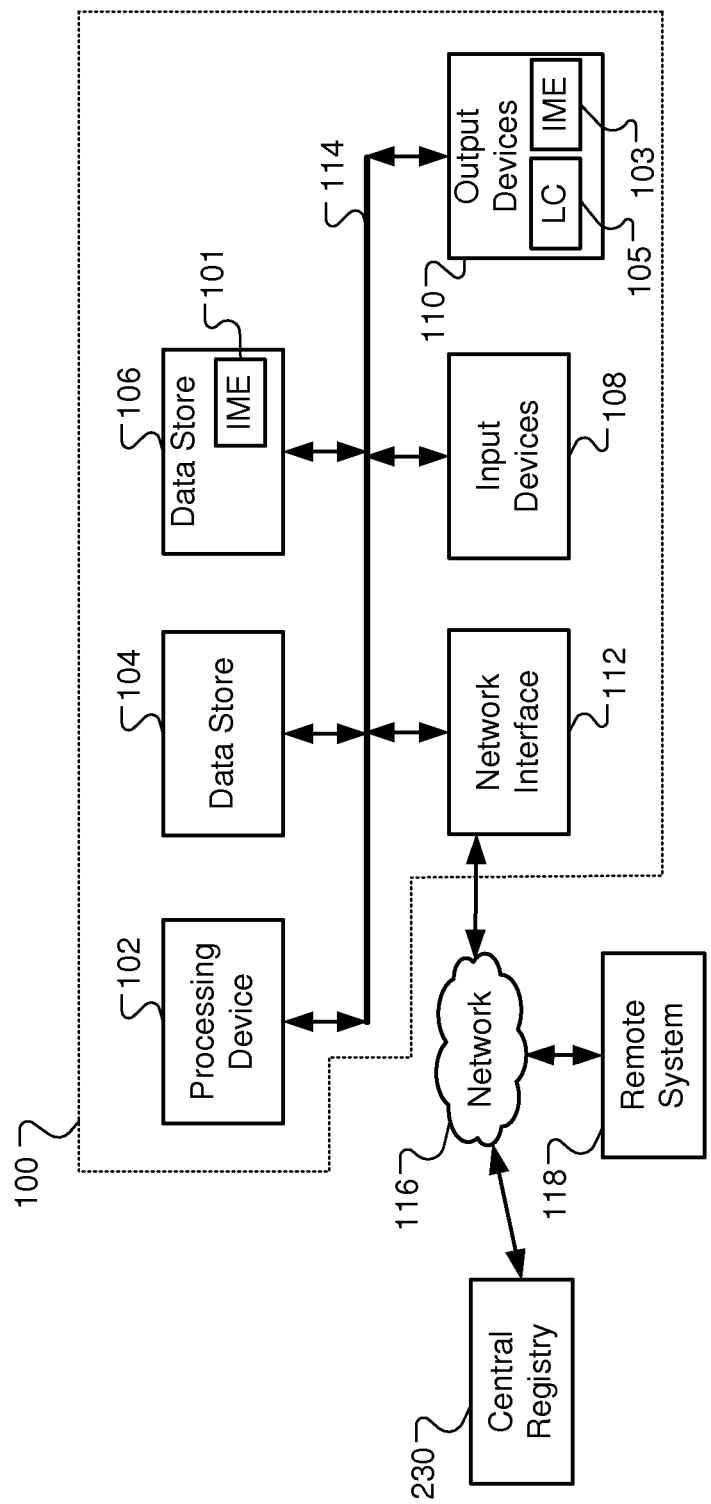
FIG. 1 is a block diagram of an example system that can be utilized to implement the systems and methods described herein.

FIG. 1 is a block diagram of an example system 100 that can be utilized to implement the systems and methods described herein. The system 100 can include, for example, a computer device, such as a personal computer device, or other electronic devices, such as a mobile phone, mobile communication device, personal digital assistant (PDA), and the like. The system 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other system architectures can also be used.

The processing device 102 can include, for example, one or more microprocessors. The first data store 104 can include, for example, a random access memory storage device, such as a dynamic random access memory, or other types of computer readable medium memory devices. The second data store 106 can include, for example, one or more hard drives, a flash memory, and/or a read only memory, or other types of computer readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the system 100 can include IME code 101 from a data store, such as the data store 106. The IME code 101 can include instructions that upon execution cause the processing device 102 to carry out IME functions. The IME code 101 can include, for example, interpreted instructions, such as script instructions, e.g., JavaScript or ECMAScript instructions, that can be executed in a web browser environment. Other implementations can also be used, e.g., a stand-alone application, an applet, a plug-in module, etc.

Execution of the IME code 101 generates or launches an IME instance 103. The IME instance 103 facilitates the processing of one or more input methods at the device 100, during which time the system 100 can receive composition inputs for input characters or symbols, such as, for example, Hanzi characters. For example, the user can use one or more of the input devices 108 (e.g., a keyboard, such as a Western style keyboard, a stylus used with a handwriting recognition engine, etc.) to input composition inputs for identification of Hanzi characters. In some examples, a Hanzi character can be composed of more than one composition input.

The first data store 104 and/or the second data store 106 can store an association of composition inputs and characters. Based on a user input, the input method editor instance 103 can use information in the data store 104 and/or the data store 106 to identify one or more candidate selections represented by the input. In some implementations, if more than one candidate selection is identified, the candidate selections are displayed on an output device 110. Using the input device 108, the user can select from the candidate selections a Hanzi character that the user desires to input.

In some implementations, the IME instance 103 on the system 100 can receive one or more Pinyin composition inputs and convert the composition inputs into Hanzi characters. The IME instance 103 can, for example, use compositions of Pinyin syllables or characters received from keystrokes to represent the Hanzi characters. Each Pinyin syllable can, for example, correspond to one or more keystrokes in the Western style keyboard. Using a Pinyin IME, a user can input a Hanzi character by using composition inputs that includes one or more Pinyin syllables representing the sound of the Hanzi character. Input methods for other languages, however, can also be facilitated.

In some implementations, a remote computing system 118 having access to the system 100 can also be used to edit a logographic script. For example, the system 100 may be a server that provides logographic script editing capability via the network 116. In one example, a user can edit a logographic script stored in the data store 104 and/or the data store 106 using a remote computing system, e.g., a client computer. The system 100 can, for example, select a character and receive a composition input from a user over the network interface 112. The processing device 102 can, for example, identify one or more characters adjacent to the selected character, and identify one or more candidate selections based on the received composition input and the adjacent characters. The system 100 can transmit a data communication that includes the candidate selections back to the remote computing system.

In some implementations, the IME instance 103 can identify candidate selections based on one or more composition inputs and language contexts 105. The language contexts 105 can, for example, define different languages supported by the input method editor instance 103, e.g., an English language context 105a, a Chinese language context 105b, a Korean language context 105c, etc. For example, the IME instance 103 can apply the English language context 105a to composition inputs to map the composition inputs to the English alphabet. Likewise, the IME instance 103 can apply the Chinese language context 105b to composition inputs to map the composition inputs to Pinyin inputs, etc.

Based on the composition inputs and the language contexts 105, the IME instance 103 can identify one or more candidate selections for selection by the user. In some implementations, the language contexts 105 can be utilized to automatically provide candidate selections defined by different languages, e.g., an interleaved display mode in which candidate selections from the English language, e.g., letters defining a word, can be displayed simultaneously with Chinese characters, e.g., Hanzi characters. In some implementations, the language contexts 105 can be utilized to automatically provide candidate selections defined by a one language, e.g., a toggled display mode in which candidate selections from only the English language, e.g., letters defining words, may be displayed for a first set of characters, and candidate selections from the Chinese language, e.g., Hanzi characters, may only be displayed for a second set of characters.

Figure 2:
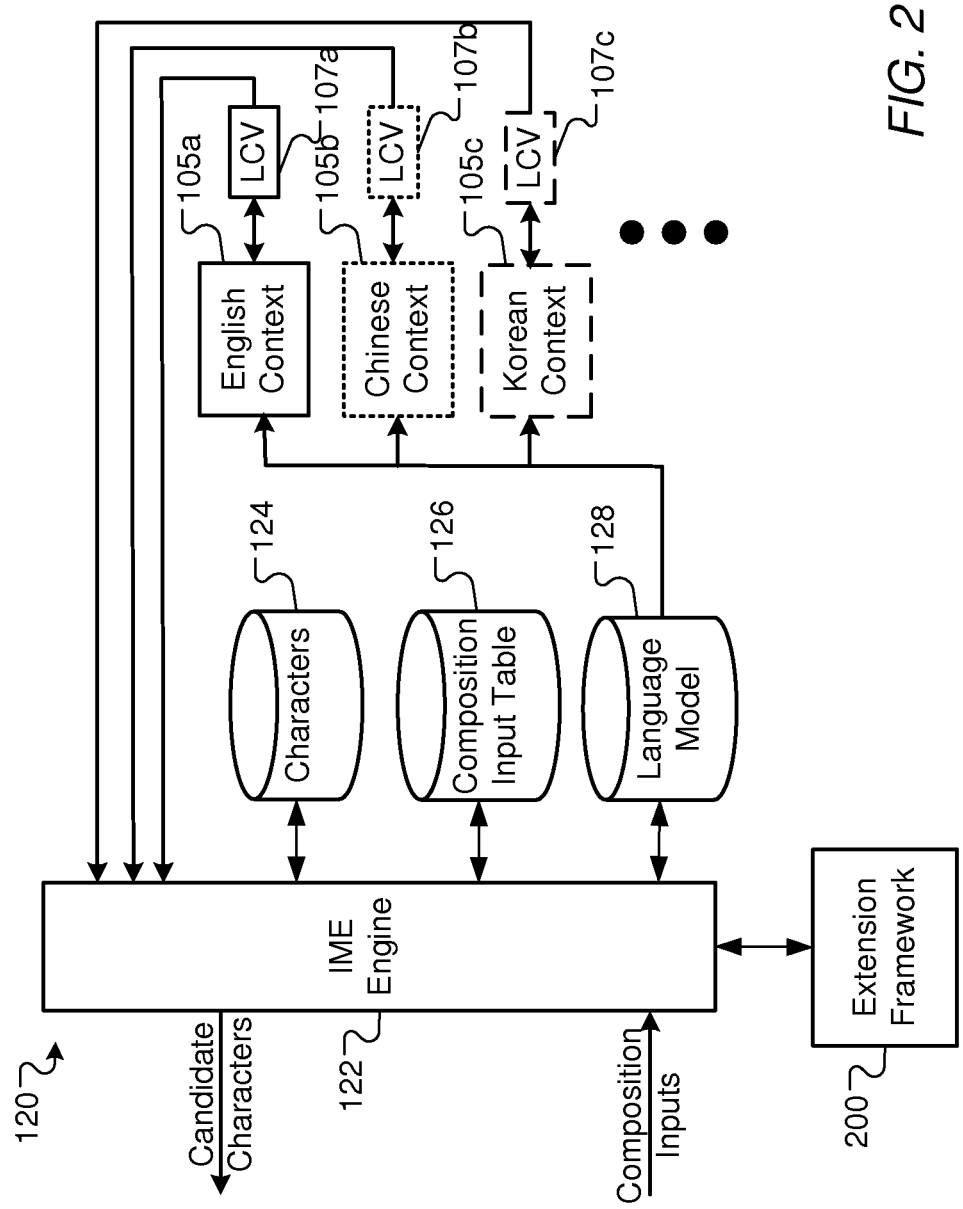
FIG. 2 is a block diagram of an example input method editor (IME).

FIG. 2 is a block diagram of an example IME system 120. The IME system 120 can be implemented, for example, using the input method editor code 101 and associated data stores 104 and 106. The IME system 120 includes an IME engine 122, a character data store 124, a composition input data store 126, a language model data store 128, and an extension framework 200. Other storage architectures can also be used. The character data store 124 includes characters of a logographic script used in one or more language models, and characters and words in Roman-based or western-style alphabets, e.g., English, German, Spanish, etc. In some implementations, the character data store 124 also includes information about relationships between characters. For example, the character data store 124 can include scores or probability values assigned to a character depending on characters adjacent to the character. Other contextual relation data can also be used. As discussed in further detail below, the extension framework 200 interacts with the IME engine 122 to support arbitrary query-to-candidate(s) mappings.

The composition input data store 126 includes an association of composition inputs and the characters stored in the character data store 124. In some implementations, the composition input data store 126 can link each of the characters in the character data store 124 to a composition input used by the input method editor engine 122. For example, the IME engine 122 can use the information in the character data store 124 and the composition input data store 124 to associate and/or identify one or more characters in the character data store 124 with one or more composition inputs in the composition input data store 126.

The language model data store 128 can define one or more language models, e.g., an English language model, a Chinese language model, etc. Each language model can, for example, define a particular rule set, e.g., grammar particular to a language, phrase sets, verbals, etc., that can be used to determine a user's likely intent in entering a set of composition inputs. Each language model can also include a user history of a particular user, e.g., a dictionary of words and phrased often used by a particular user.

In some implementations, the IME engine 122 can interpret the composition inputs according to a language context 105, e.g., an English context 105a, a Chinese context 105b, a Korean context 105c, etc. When the composition inputs are interpreted according to a language context 105, a language context value 107 can be determined. Based on the language context value 107 and the composition inputs, candidate selections can be identified and presented to a user for selection.

For example, several composition inputs, e.g., keystrokes, can be received by the input method editor engine 122. The keystrokes may define a series of Pinyin inputs in the Chinese context 105b, and may define a series of letters in the English context 105a. Accordingly, one or more English candidate selections, e.g., words, and one or more Chinese candidate selections, e.g., Hanzi characters, can be presented to the user for selection.

In some implementations, the English context value 107a can be determined by comparing the composition inputs to prefixes of English words and setting the English context value based on the comparison. For example, the composition inputs o-p-p-o match the character strings in the word "opportunity." The English context value 107a can, for example, be set in proportion to the prefix match identified by the comparison, e.g., the context value may be low for the composition inputs o-p, but may be much higher for the composition inputs o-p-p-o-r-t-u.

Language context values 107 can also be determined by other processes. For example, the Chinese context value 107b can be determined by evaluating the Chinese characters against a Chinese language model and setting the Chinese context value 107b based on the evaluation. For example, a Chinese language model can include a Chinese grammar model. Example Chinese grammar models can include serial verb construction models, perfectives and imperfectives models, and other grammar models.

Based on composition inputs, e.g., keystrokes, a series of Pinyin inputs can be identified. The Pinyin composition inputs, in turn, can be utilized to identify Hanzi characters. The Chinese grammar model can be applied to the Hanzi characters to determine the likelihood of the user intending to input in the Chinese context. For example, a composition input string that results in Hanzi characters that are all verbs would be scored very low, but a composition input string that results that result with a verb and an object would be scored higher, etc. By way of another example, a composition input that results in the Chinese character string that reads "I love flowers" would receive a higher Chinese context value 107b, and composition input string that results in the Chinese character string that reads "bed cow tv" would receive a very low Chinese context value 107b.

Other processes can be used to determine language context values 107. For example, the context value of an infrequently used word of a particular language may be scaled lower, while the context value of an often used word or phrase as defined by a user profile may be scaled higher, etc.

§2.0 Extension Framework

The IME provides a query-to-candidate(s) mapping function that can be generally provided as:

f(query)=candidate(s)

where query is a sequence of ASCII keys. Using the Chinese language as an example, the resultant candidates can include a list of Chinese or non-Chinese strings. For example:

f("pinyin")=["拼音", "品", "颁", "拼", . . . ]

shows the pinyin-to-Chinese mapping which is the base input mode of a Pinyin IME.

There are other mappings that can map ASCII queries to one or more candidates (e.g., Chinese or non-Chinese candidates). As one example, an IME can function in an English auto-complete mode to provide a list of word candidates based on a partial word input. For example:

f("eng")=["eng", "English", "engineering", . . . ]

As another example, an IME can function in a Chinese number input mode. For example:

f("i123")=["一百二十三", "壹佰贰拾叁", "一二三"]

The IME extension framework of the present disclosure extends the capabilities of the IME by providing a command extension mode (referenced as "extension mode") that enables the IME to support arbitrary query-to-candidate(s) mappings in order to fulfill different user needs and/or preferences. The IME extension framework achieves this without requiring hard-coding of the underlying mapping functions. Generally, the IME extension framework includes a script engine, a sandbox process, a script repository, an inter-process communication (IPC) mechanism, a public application program interface (API) and a console tool. The script engine hosts the runtime of a script language interpreter to run one or more scripts stored in the script repository, and return results. The sandbox process executes the script engine in a secure environment. The IPC mechanism enables communication between the IME engine and the sandbox process. The public API enables third-party developers to write IME extensions in a unified manner, and the console tool enables developers to test and verify the created extension scripts.

Figure 3:
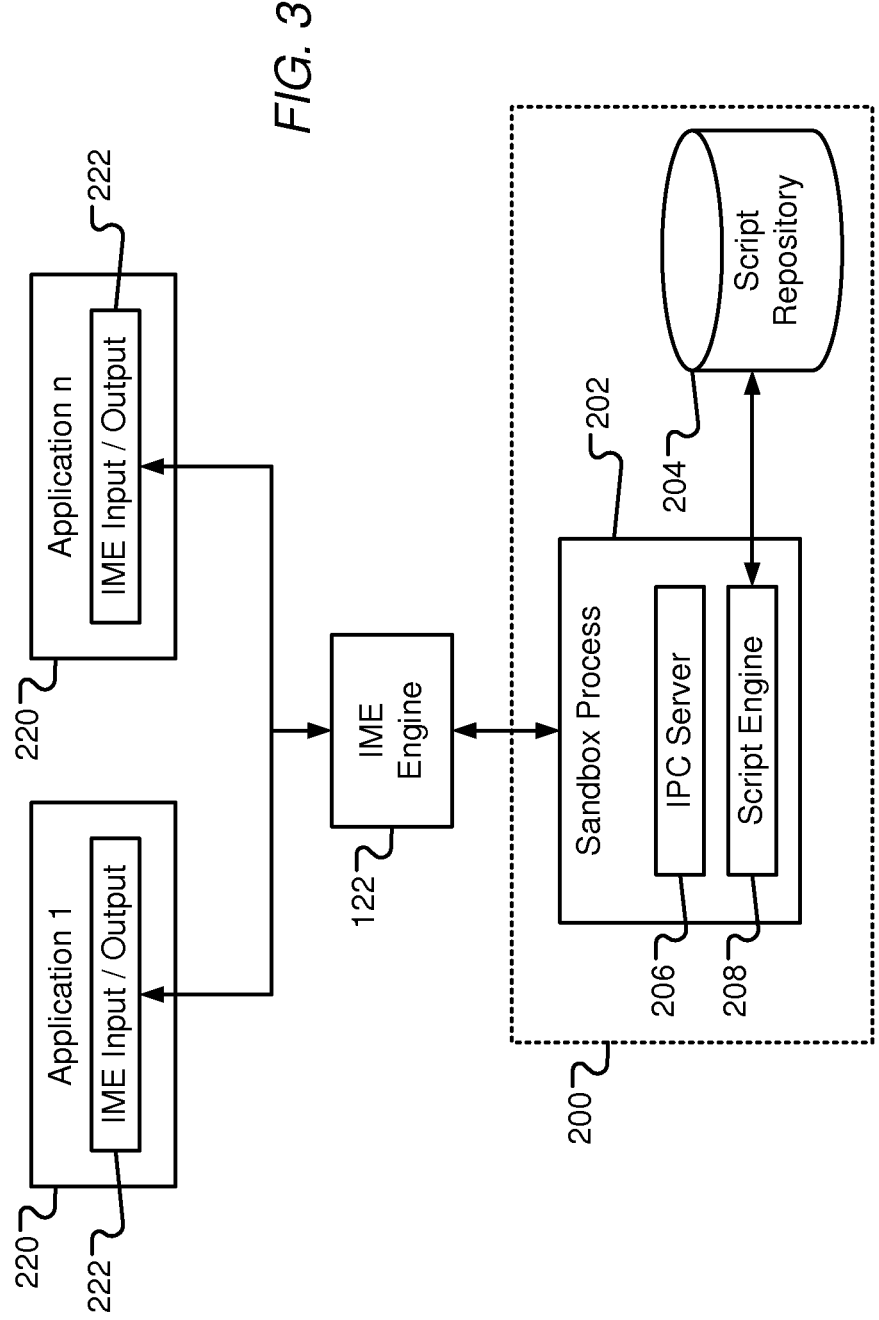
FIG. 3 is a block diagram of an example IME extension framework.

FIG. 3 is a block diagram of an example IME extension framework 200. The IME extension framework 200 is implemented when the IME is operating in the command extension mode and includes a sandbox process 202 and a script repository 204. The sandbox process 202 executes an IPC server 206 and a script engine 208. The IME extension framework 200 communicates with the IME engine 122 to provide script-based query-to-candidate(s) mapping based on user input. Specifically, a user can interact with one or more applications 220. Each application 220 includes a user interface 222 for receiving user input and displaying one or more candidates generated based on the user input. By way of non-limiting example, each application 220 can include a word processing application, a text editing application, a spreadsheet application, an email application, a presentation application, and/or a web browser.

Query-to-candidate(s) mappings provided by the IME extension framework 200 can include one-to-one mappings that can be implemented by a simple table look-up. The mappings provided by the IME extension framework 200 can also include more complicated query-to-candidate(s) mappings that are based on an implemented script language. For example, a script-based extension can be provided to convert user text input from a horizontal layout to a vertical layout, as below:

‖到│把‖
‖下│您‖
‖面│要‖
‖的│转‖
‖输│换‖
‖入│的‖
‖框│文‖
‖中│字‖
‖　│输‖
‖　│入‖

Furthermore, the IME extension framework 200 enables access to remote resources by connecting to such resources though a network (e.g., the network 116 of FIG. 1). For example, services provided by an online service provider (e.g., Google) can be connected to by executing an extension script. In this manner, the extension script functions can access the service provider's services to implement more useful input features. Example input features can include querying Google Maps for a detailed address string (e.g., provides as a user selectable hyperlink), guiding the IME user to Google search, retrieving Google suggested results, and/or converting user input to another language and/or symbols using Google Translate. The IME extension framework 200 further enables third-party developers to write customized query-to-candidate(s) mapping logic using script programming, as opposed to C++ coding then compiling, as discussed in further detail below.

Extension scripts can be generated and tested by third-parties. Functioning extension scripts can be registered and published to be made available to IME users. For example, through the IME, a user can request a list of available (i.e., published extension scripts). The IME can connect to a central registry over a network (e.g., central registry 230 over network 116 of FIG. 1), for example, which central registry stores the published extension scripts. The user can select one or more extension scripts, and the selected extension scripts are downloaded and installed to the user's local device to be called when operating the IME in the extension mode. The extension scripts can be stored in the script repository 204, which can be provided in digital memory of the system 100. The script repository enables the script engine 208 to load and execute a corresponding script locally. All scripts installed by the user are stored in the script repository 204. In some implementations, one or more script host web sites (e.g., maintained by third party developers) each functions as remote a script repository, remote from the user device. The user device can access the one or more script host web sites, and can be provided with a list available scripts available from the particular site, and to download selected scripts to the script repository 204.

When operating in the extension mode, the IME extension framework 200 retrieves and executes installed command extensions and provides one or more results to the IME engine for display to the user. The results can be comprised of logographic characters, non-logographic characters, numbers, mathematical expressions, hypertext links, icons, emoticons and/or symbols. By way of non-limiting example, symbols can include mathematical symbols (e.g., Σ, √, ∞, ∩, ≈, ≠, ≡, ≤, ≥, etc.), zodiac symbols (e.g., ♈, ♉, ♊, ♋, ♌, etc.), or any other type of symbol (e.g., ¶, ↓, ↑, ₣, £, &, $, ♪, ♫, etc.). The extension mode includes a command extension mode (referenced as "i-ext mode"), a trigger extension mode, and a handler extension mode. In the command extension mode, an extension function is called when the user inputs a particular character sequence. An example character sequence can include: i+command+argument, discussed in further detail below. In the trigger extension mode, an extension function is called when the input sequence, or one of the candidates generated by the IME matches a pre-registered trigger string or pattern. That is, the IME generates one or more candidates based on the input sequence, and both the input sequence and the one or more candidates are reviewed to determine a match with a pre-registered trigger pattern. In the handler extension mode, all of user input is directed to the extension function and all candidates to be displayed by the IME are generated by the extension function. In this mode, the behavior of the IME is controlled by the called extension script. Accordingly, the user explicitly instructs the IME (e.g., clicking on an extension-registered hotkey) to enter the handler extension mode, and to route all user input to the extension script.

Third-party developers can register extension scripts for use in the command extension mode by providing a multi-character command name, an entry function name, and a short description. For use in the trigger extension mode, third-party developers can register extension scripts by providing an entry function name, a short description, 0~N trigger strings/patterns to match user input, 0~M trigger strings/patterns to match one or more IME generated candidates. For use in the handler extension mode, third-party developers can register extension scripts by providing the name of the input mode handled by the extension, an entry function name, a short description and a custom hotkey or a menu item to enable user to activate the handler extension mode. This information is stored in the central repository for download and installation by IME users.

Operation of the IME in the extension mode (i.e., one of the command, trigger and handler extension modes) is discussed in further detail below.

§2.1 Script Engine

The script engine initializes the script runtime environment, registers built-in routines into the runtime, loads scripts from the script repository and evaluates mapping functions per the request of IME core engine. Multiple script languages (e.g., JavaScript, Lua or VBScript) can be supported in parallel. For example, the script engine can choose a corresponding script language runtime based on the file extension of the loaded script (e.g., .js .lua or .vb), and evaluate the function at runtime.

In some implementations, the script language can be directly embedded and the MS Windows Script Engine can be used via the IActiveScript interface. In such implementations, no additional installer size is required, two script languages (e.g., JavaScript and VBScript) can be supported without additional effort, and pre-installed ActiveX controls can be leveraged. In some implementations, an embedded Lua runtime engine can be provided. Lua runtime memory requirements are very small (e.g., only approximately 50 KB of additional installer memory is required). Further, the Lua runtime is easy to trim and/or customize, and it is easy to white-list Lua features and built-in routines to avoid security risks. In some implementations, an embedded JavaScript engine, for example, can be implemented. JavaScript is a popular script language among web developers, is faster than the Windows Script Engine when running JavaScript code, and can be trimmed or customized.

In implementations including an embedded Lua runtime engine, the Lua runtime engine can include one or more of the following modules: lexer and parser, virtual machine, memory management and garbage collection, pre-compiled chunk dump/undump, Lua API, debug support, and built-routines. The built-routines module can include a base library, co-routine routines, module/package routines, string library, math library, operating system library, table library, input/output library, and/or debug library. These modules can be customized and trimmed to minimize the binary size, or to white-list features and built-in routines for security considerations. One purpose of customizing Lua runtime is to limit the language features and built-in routines that can be used by third party developers. With only IME-relevant routines like string routines, math routines, table routines and IME-specific routines, third-party developers can not directly impact a user's local system even without the protection of the sandbox, discussed in detail below.

Generally, the IME extension framework is language independent. Consequently, the IME extension framework can support any script language, and is not limited to the script languages discussed herein.

§2.2 Sandbox Process

A sandbox is a restrictive environment in which a program runs, and is typically facilitated by a library that enables processes, such as the script engine, to execute within the restrictive environment. When sandboxed, the script engine has limited functionality. In some implementations, the script engine can only access CPU cycles and memory. In such implementations, the sandboxed script engine cannot write to disk or display its own window, for example. By confining the script execution to the sandbox process, third-party scripts can be logically separated from the application(s).

The allowed functionality of the script engine is regulated by an explicit policy. The sandbox leverages the security provided by the particular operating system to allow code execution that cannot make persistent changes to the computer or access information that is confidential. The architecture and exact assurances that the sandbox provides are dependent on the operating system. In Windows, for example, code cannot perform any form of I/O without making a system call. In most system calls, Windows performs a security check. The sandbox ensures that the security checks fail for the particular actions that the server process is prohibited from performing as defined in the corresponding policy.

In some implementations, the sandbox relies on the protection provided by operating system mechanisms that can include, but are not limited to, tokens, objects and/or integrity levels. These example mechanisms are highly effective at protecting the operating system, its configuration, and user data. The actual restrictions are configured by the policy, which is a programmatic interface that can be called to define the restrictions and allowances of the script engine. In some implementations, example mechanisms that control the restrictions include a main token, an impersonate token and a job token. Some implementations further include an integrity level (e.g., implementations including the Windows Vista operating system).

As another example, the Chrome operating system, provided by Google, provides for the creation of a sandbox process (e.g., the script engine). The Chrome operating system restricts the privileges of the sandbox process using token restriction, job object and API interception, and uses a simple shared memory as IPC to provide communication between the sandbox process and a broker process (e.g., the IME engine). For example, the IME engine provides an auto-start IME daemon process that can be used to start and initialize the sandbox process. For the IME extension framework of the present disclosure, a simpler sandbox can be implemented (e.g., a sandbox that uses token restriction and job object to limit the privileges of the script engine, without using API interception). Further, the sandbox process itself can play the server role in the IPC.

As discussed above, token restrictions, a job object and API interception can be implemented to restrict the privileges of the sandbox process. With regard to token restrictions, a process (e.g., the script engine) starts in the sandbox with a token (e.g., access token) that is stripped of some or all of its security identifiers (SIDs). Without any SIDs, access to securable objects will be denied by the security manager of the operating system. With regard to a job object, the process (e.g., the script engine) can be run in a job object that is used to limit the process' capabilities. Specifically, limits are placed on the job object to prevent processes from changing tokens, sending messages outside of the job scope, and/or creating new desktops. API interception can be used to control access of the sandboxed process to non-securable resources, and to intercept and fail low-level API calls.

The auto-start daemon process of the IME engine can be used to start and initialize the sandbox process. To achieve this, the daemon process can make restricted tokens, make a job object and limit its capabilities, spawn the sandbox process with restricted token, assign the sandbox process to the job object, and/or change the token of the main thread of the new process to an impersonation token having more rights. The IME engine can load extension scripts, and can initialize the script engine and the IPC server with an impersonation token having more rights.

§2.3 Communication Between IME and Sandbox Process

In some implementations, communication between the IME engine and the sandbox process can be established using IPC, as discussed above. IPC provides a set of techniques for the exchange of data among multiple threads in one or more processes. IPC method techniques can include remote procedure call (RPC). RPC enables a subroutine or procedure to execute in another address space that is different from the address space of the calling program application.

In some implementations, the IME engine communicates with the script engine, which is wrapped in the sandbox, using a simple shared memory IPC. A notification mechanism can be implemented based on operating system events, for example, to handle message sending and receiving. To achieve this, the IPC can be provided as a simpler IPC (e.g., simpler than the Chrome sandbox broker-target IPC). For example, the IPC server, which is also wrapped in the sandbox, does not need to support multiple tasks. The IPC interface can use protocol buffers as the data format when transferring information between the IME engine and the sandbox process.

In some implementations, the IPC supports arbitrary request and response types using C++ template and protocol buffers. Example IPC requests and responses can include, for example:

```
message IpcRequest {
    enum Flag {
        FILL_CONTEXT = 0;
        IS_COMMAND_REGISTERED = 1;
        LIST_ALL_COMMANDS = 2;
        GET_COMMAND_INFO = 3;
        DO_COMMAND = 4;
        GET_TRIGGER_LIST = 5;
        FIRE_TRIGGER = 6;
    };
    required Flag flag = 1;
    optional ImeContext ime_context = 2;
    optional string command_name = 3;
    optional string command_argument = 4;
    optional string function_name = 5;
};
message CommandResult {
    repeated string candidates = 1;
    repeated Metatable metatables = 2;
};
```

§2.4 Public API

As discussed above, the public API enables third-party developers to write IME extensions in a unified manner. An extension script written in the Lua script language, for example, contains one or more query-to-candidate(s) mapping functions. An example mapping function includes:

```
function calc(input)
    expr = "return " .. input
    return (loadstring (expr) ( ) )
end
```

The mapping function can be registered as an extension command. Specifically, a register function enables a developer to register the extension, which can be provided as a command extension, a trigger extension or a handler extension, each if which is discussed in further detail herein.

The name of the command extension can be provided as a multi-character string (e.g., 2-character string) that is used to match the command string input when in the extension mode. An argument that is input using the extension mode is passed in as the argument string of the function call (e.g., Lua function call). The argument is ignored by the IME engine, if the function does not require any argument. That is, even if the user explicitly inputs an argument after the command, the function will ignore the argument if it does not require an argument. In some script languages (e.g., Lua or JavaScript) a function can be defined as has-no-argument, but the caller can still pass in some argument that will be ignored. If the user input is not provided in the extension mode, an empty string will be passed into the function. Duplicate extension command names are not allowed by the script engine. If, for example, a first script has a corresponding registered extension command name, and a developer attempts to register a second script using the same command name, the function will return false. The return value of extension function can be one object (e.g., string or number), or a table containing two or more objects (e.g., string or number). The IME engine uses the string representation of each object as a candidate that is displayed by the IME front-end.

2.5 Developer Tool

As discussed above, the IME extension framework of the present disclosure provides a developer tool that enables third-party developers to create and register extension scripts for use with the IME. The developer tool includes white-listed (i.e., approved) routines. By limiting the usable routines, third-party developers are inhibited from directly impacting a user's local system even without the protection of the sandbox. In the example case of Lua-based extension scripts, the white-listed routines can include: base routines (e.g., assert, error, ipairs, loadstring, next, pairs, select, tonumber, tostring, type, unpack), string routines (e.g., string.byte, string.char, string.find, string.format, string.gmatch, string.gsub, string.len, string.lower, string.match, string.rep, string.reverse, string.sub, string.upper), datetime routines (e.g., os.date, os.time, os.difftime), math routines (e.g., math.abs, math.acos, math.asin, math.atan, math.ceil, math.cosh, math.cosh, math.cos, math.deg, math.exp, math.floor, math.fmod, math.frexp, math.log, math.ldexp, math.log10, math.max, math.min, math.modf, math.pi, math.pow, math.rad, math.random, math.randomseed, math.sinh, math.sin, math.sqrt, math.tanh), and table/list manipulation routines (e.g., table.concat, table.insert, table.maxn, table.remove, table.sort).

Besides the white-listed routines, a language IME module can be provided to enable additional functionality. In the example case of the Lua script language, a Lua IME module is executed in the script engine to provide IME related functions or other helper functions. The multiple register functions, discussed above, are provided by the Lua IME module for developers to register extensions with the IME extension framework. The Lua IME module also provides helper routines (e.g., ime.parse_mapping, ime.join_string). A helper routine helps the developer to easily implement IME extensions. For example, the code of many extension scripts share some common logic (e.g., to split a string literal into a mapping). The helper routines can save the effort of writing an extension from scratch.

Additional routines can be provided in the Lua runtime by implementing routines in C/C++ and registering such routines into the Lua runtime, and/or implementing routines in Lua itself and loading the script as an initial script.

Example code for registering a C/C++ function into the Lua runtime includes:

```
static const luaL_Reg kImeModuleMappings [ ] = {
    // Must-have interface for i-ext mode script to
    register its own commands.
    {"register_command", ImeRegisterCommand},
    // Other IME specific features which can be used by i-
    ext
    mode scripts.
    {"get_version", ImeGetVersion},
    //...
    {NULL, NULL}
};
void LuaImeModule::Load(lua_State* lua_state,
                        LuaLanguageRuntime* lua_runtime)
{
    DCHECK (lua_state && lua_runtime);
    luaL_register (lua_state, kLuaImeModuleName,
    kImeModuleMappings);
    SetLuaLanguageRuntime (lua_state, lua_runtime);
}
```

Example code for implementing the Lua IME module routines in Lua itself includes:

```
- - Assuming the ime module already exists in the global
environment
function ime.parse_mapping (src_string, line_sep,
key_value_sep,
values_sep)
    local result_table = { }
    local lines = ime.split_string (src_string, line_sep)
    for i, line in ipairs (lines) do
        local fields = ime.split_string (line, key_value_sep)
        if #fields == 2 then
            local key = fields [1]
            if #key > 0 then
                local values = fields [2]
                local value_table = ime.split_string(values,
values_sep)
                if not result_table [key] then
                    result_table [key] = { }
                end
                for i, value in ipairs (value_table) do
                    if #value > 0 then
                        table.insert (result_table [key], value)
                    end
                end
            end
        end
    end
    return result_table
end
```

In C++, the following example code can be used to load the routines implemented in Lua itself:

```
int status = luaL_loadbuffer (lua_state,
    routines_in_lua.c_str ( ),
                routines_in_lua.size ( ), "");
if (!status) {
    status = lua_pcall (lua_state, 0, LUA_MULTRET, 0);
    if (status)
        DLOG (INFO) << "error when loading ime module
implemented in
Lua";
}
```

Generally, and for some script languages (e.g., Lua), predefined built-in routines can either be implemented in the language in which the language's interpreter is implemented, or be implemented in the script language itself. To simplify this, assuming the Lua language's interpreter is implemented in C++, a first routine is implemented in C++, and a second routine is implemented in Lua: when the Lua interpreter is loaded, the first routine is native machine code and is loaded together with the Lua interpreter. The second routine is in Lua so it is loaded as a common Lua script is loaded, but is marked as *built-in routines* by Lua. When the script calls the first routine then the second routine, the Lua interpreter executes the first routine without further operations, because the first routine is already compiled into native machine code. However, for the second routine, the Lua interpreter must first interpret the second routine then execute it just as it executes a normal script.

§2.6 Connection Routines

As discussed above, the IME extension framework of the present disclosure enables access to services provided by one or more online service provider to implement more useful input features. Specifically, connection routines, including hypertext transfer protocol (HTTP) connection routines, can be provided by the IME module executed in the script engine, to enable extension scripts to fetch online data from online service providers. Some example APIs can include: ime.google_translate (text, from_language, to_language, callback), which provides a translation service; and ime.google_search (query, parameters, callback), which provides a search service.

The connection routines are asynchronous, because time may be required to return the result. The extension script defines its own callback function to receive the result when the data transfer is complete. The callback function instructs the IME engine to display candidates using an API. An example API can include: ime.show_result (query_id, candidates), which displays the results of a search service. The IME engine and the IME front-end are aware of the asynchronous behavior, and a waiting icon (e.g., an hourglass) can be displayed during the processing.

3.0 General Operation

The IME can function in a base IME mode to process user input using a traditional query-to-candidate(s) mapping. The IME can also function in the extension mode to process user input using the IME extension framework. That is, the IME can function in one of the command, trigger and handler extension modes to process user input using an identified extension script.

Figure 4:
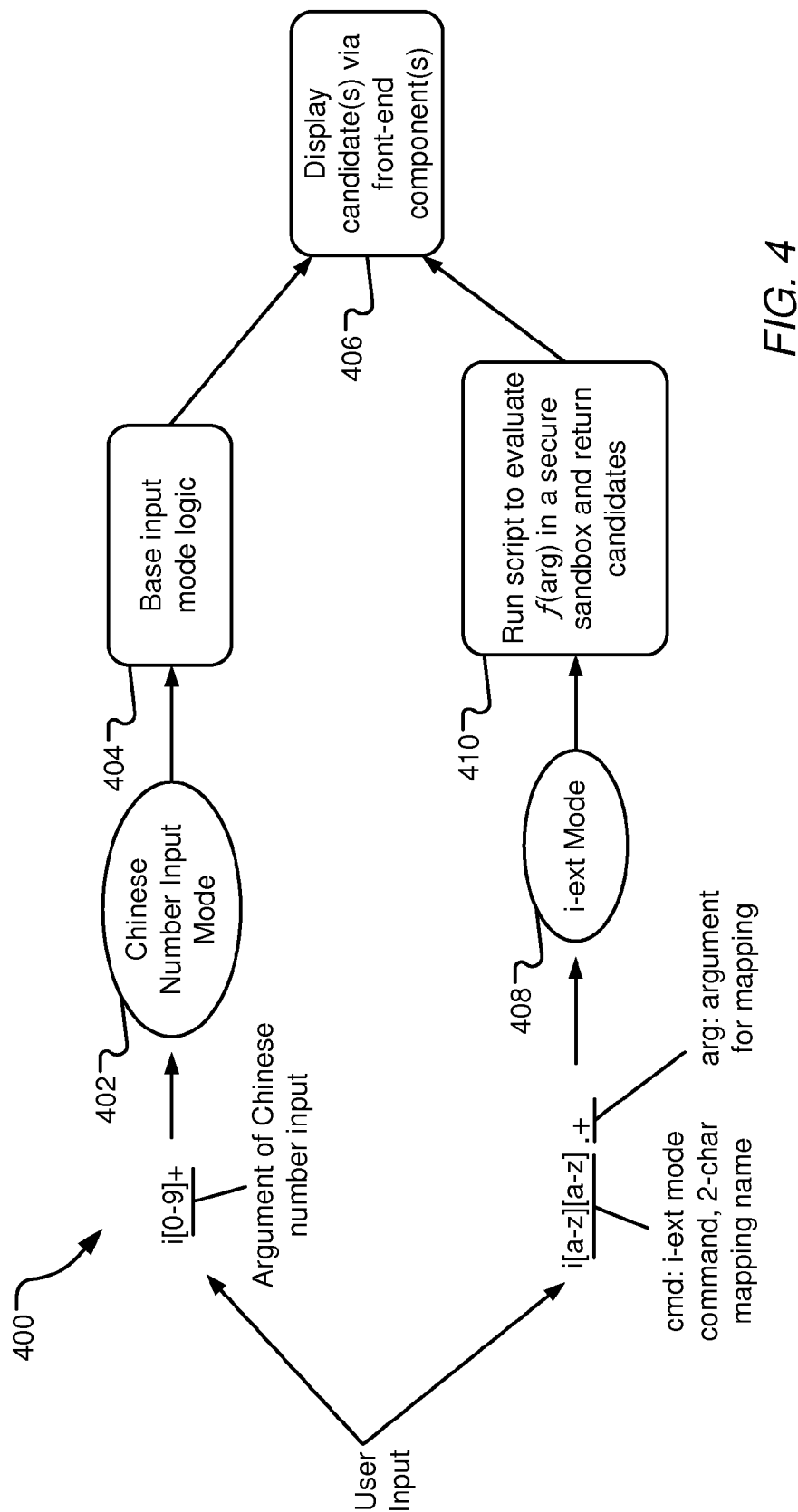
FIG. 4 is a flow diagram illustrating an example process for a command extension mode of the IME.

FIG. 4 is a flow diagram illustrating an example process (400) for the command extension mode of the IME. In FIG. 4, Chinese is referenced by way of non-limiting example. The example process (400) can be executed by the system 100, for example, using the IME engine 122 and the extension framework 200. User input is received at the IME engine 122, and can be provided in one of a plurality of input patterns. One input pattern can be provided as an input character (e.g., "i") followed by an argument (e.g., [0-9]+). Accordingly, the combined input pattern can be provided as i[0-9]+, which initiates (402) the base input mode of the IME (402) to provide a query-to-candidate(s) mapping. Specifically, existing i-mode logic is applied (404) to the argument to provide one or more candidates for display to the user. In some implementations, the existing i-mode logic can use a simple table look-up to determine relevant candidates, using the argument as input to the table. The one or more candidates are displayed (406) to the user via one or more front-end components (e.g., the output devices 110).

Another input pattern can be provided as an input character (e.g., "i") followed by a multi-character script name (e.g., [a-z][a-z]) and an argument to be processed by the script (e.g., .+). Accordingly, the combined input pattern can be provided as i[a-z][a-z].+, which initiates (408) the command extension mode ("i-ext mode") of the IME to provide a query-to-candidate(s) mapping based on a script that is processed by the IME extension framework 200. Specifically, the script designated by the user input is executed (410) to evaluate the argument ("arg") and to determine or generate one or more candidates. In some implementations, the script can use a simple table look-up that is defined in the script to determine relevant candidates, using the argument as input to the table. In other implementations, the script can mathematically process the arguments to generate the relevant candidates. In some implementations, the script can access a networked resource (e.g., provided by a service provider) to generate the relevant candidates, as discussed above. In some implementations other functionality and/or combinations of the functionality can be provided to generate the candidates. The one or more candidates are provided to the IME engine 122 for display (406) to the user via one or more front-end components (e.g., the output devices 110).

One or more trigger extensions can be registered with the IME. Each trigger extension includes a trigger string or pattern that, when recognized by the IME engine 122, initiates the trigger extension mode. Specifically, the user input to the IME can be compared to the registered trigger strings. If the user input matches a trigger string, the user input is provided to the IME extension framework 200 to process the input using an identified script. In some implementations, the user input can be processed using the IME engine 122 (i.e., in the base input mode) to generate a first set of candidates, and, if the user input also matches a trigger string, the user input can be processed using IME extension framework 200 (i.e., in the trigger extension mode) to generate a second set of candidates. The second set of candidates can be provided to the IME engine 122 by the IME extension framework 200, and first and second sets of candidates can be combined by the IME engine 122 for display to the user.

In some implementations, the trigger extension mode can be initiated based on one or more candidates. Specifically, the user input to the IME can be compared to the registered trigger strings. If the user input does not match a trigger string, the user input is processed by the IME engine 122 to generate a first set of candidates. The generated candidates can each be compared to the registered trigger strings. If a candidate matches a trigger string, the candidate is processed using IME extension framework 200 (i.e., in the trigger extension mode) to generate a second set of candidates. The second set of candidates can be provided to the IME engine 122 by the IME extension framework 200, and first and second sets of candidates can be combined by the IME engine 122 for display to the user.

The IME can be set to the handler extension mode, in which all user input is provided to the IME extension framework 200 for processing. Specifically, a handler can be registered with the IME engine 122, which handler enables the user to switch between the base input mode and the handler extension mode. By way of example, such a handler can include a selectable menu item and/or a hotkey that is displayed to the user. If the user selects the menu item and/or hotkey, the handler extension mode is initiated and all user input is directed to the IME extension framework. If the user de-selects the menu item and/or hotkey, the handler extension mode is halted and the user input can be processed as discussed herein.

3.1 Example Process

Figure 5:
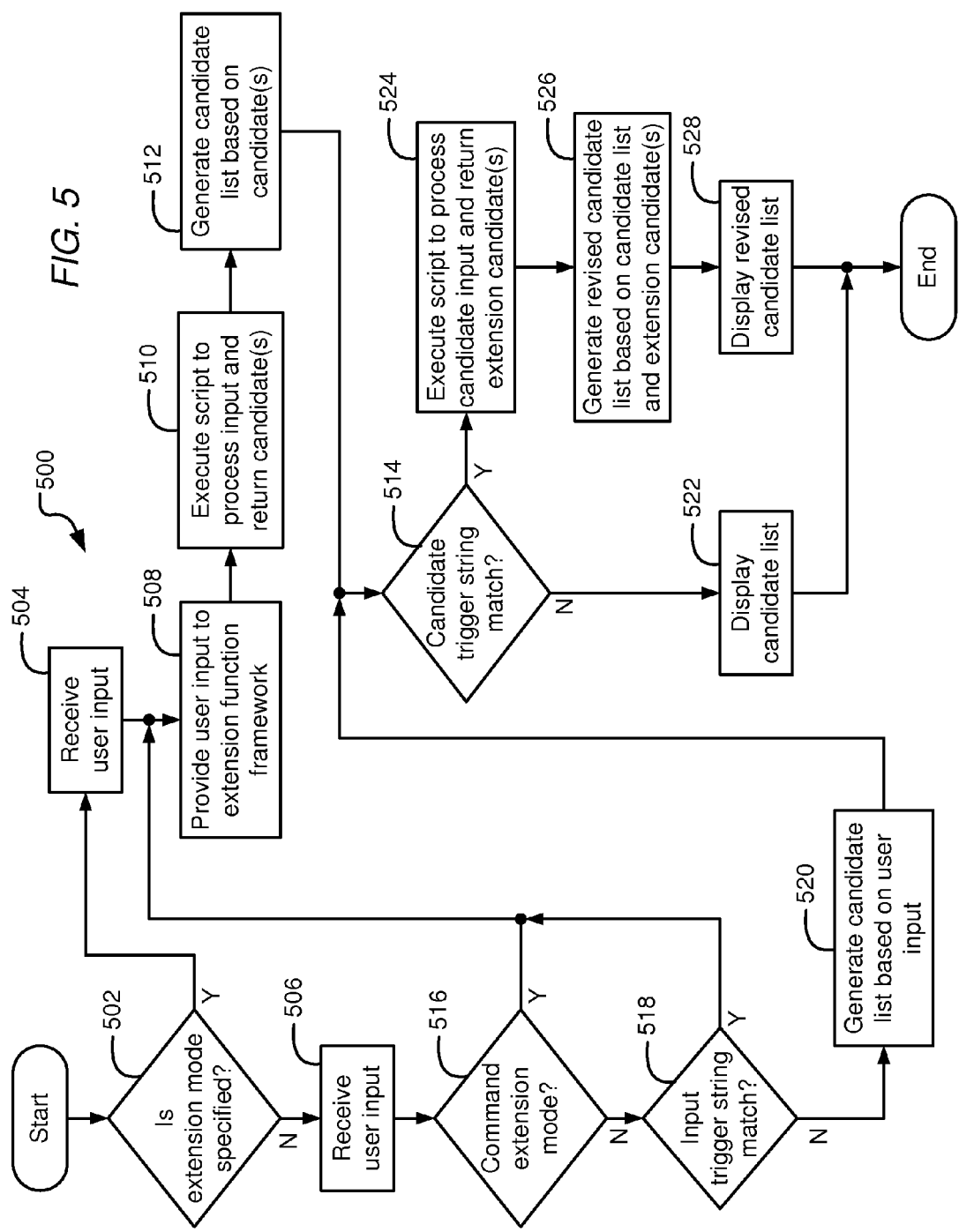
FIG. 5 is a flow diagram illustrating an example process for execution of the IME.

FIG. 5 is a flow diagram illustrating an example process 500 for execution of the IME. The process 500 can, for example, be implemented in the system 100 of FIG. 1 and/or in the IME system 120 of FIG. 2. The process 500 determines whether a particular extension mode has been specified (502). For example, a user can provide input to the system 100 (e.g., by selecting a menu item and/or a hotkey) indicating that the IME is to operate in the handler extension mode to provide all user input to the IME extension framework for processing. If an extension mode is specified, the IME system 120 is operating in the handler extension mode, and user input is received (504).

The user input is provided as input the to IME extension framework (508). The IME extension framework processes the user input by executing a script to process the user input and return one or more candidates to the IME engine (510). In such a case, the IME extension framework executes the script designated by the handler extension mode. The process 500 generates a candidate list based on the one or more candidates (512). The process determines whether any of the candidates matches a trigger string (514). For example, the WEE engine can compare each of the candidates to one or more registered trigger strings.

If an extension mode is not specified (502), user input is received (506), and the process 500 determines whether the command extension mode is to be initiated (516). For example, the IME engine can evaluate the user input to determine whether the command extension mode is to be initiated. If the command extension mode is to be initiated, the user input is provided as input the to IME extension framework (508), and the process continues as described above. In such a case, the IME extension framework executes the script designated by the user input.

If the user input does not indicate that the command extension mode is to be initiated, the process 500 determines whether the user input matches a trigger string (518). For example, the IME engine can compare the user input to one or more registered trigger strings. If the user input matches a trigger string, the user input is provided as input the to IME extension framework (508), and the process continues as described above. In such a case, the IME extension framework executes the script designated by the trigger string. If the user input does not match a trigger string, the process 500 generates a candidate list based on the user input (520). Specifically, the IME system is operating in the base input mode to provide a query-to-candidate(s) mapping using the IME engine.

The process 500 determines whether any candidate of the candidate list matches a trigger string (514). For example, the WEE engine can compare each candidate of the candidate list to one or more registered trigger strings. If a candidate of the candidate list does not match a trigger string, the process 500 displays the candidate list (522) and the process ends. For example, the IME engine can instruct an output device to display the candidate list.

If a candidate of the candidate list matches a trigger string, the candidate is provided as input to the IME extension framework, and the IME extension framework processes the candidate by executing a script to process the candidate and return one or more extension candidates to the IME engine (524). The process 500 generates a revised candidate list based on the candidate list and the one or more extension candidates (526). For example, the IME engine can receive the one or more extension candidates, and can revise the original candidate list (e.g., provided at (512) or (520)) to include the one or more extension candidates. The process 500 displays the revised candidate list (528), and the process ends. For example, the IME engine can instruct an output device to display the revised candidate list.

§4.0 Example Extensions

Example extensions and resultant candidates are provided below. The extensions and resultant candidates can be navigated using functional keys (e.g., on a keyboard), or an equivalent input (e.g., touchscreen or stylus input). Functional keys are indicated using square brackets ([ . . . ]), and example functional keys include:

[ENTER] to submit the user input
[SPACE] to submit the current candidate
[BACKSPACE] to delete the last character of the user input
[DEL] to delete the current character of the user input
[PGDN]/[PGUP] to move to previous/next candidate page, respectively
[↑] (up key)/[↓] (down key) to move within the candidate list
[←] (left key)/[→] (right key) to move the caret to edit the query
[ESC] to cancel the current input Generally, the user provides user input, which can be committed to the IME by pressing [ENTER], or an equivalent input. The user input is then processed by the IME engine 122 (e.g., in the base input mode), the IME engine 122 and the IME framework 200 (e.g., in the command extension mode or the trigger extension mode), or the IME extension framework 200 (e.g., in the handler extension mode). One or more candidates are determined and a candidate list is displayed to the user using the IME engine 122. Depending on the number of candidates, the candidate list can include more than one page, with a single candidate list page being displayed to the user at a given time. The candidates can be provided in letter or numeric order, each candidate having a sequence letter or number associated therewith, as illustrated below. The user can navigate the candidate list and/or pages using [PGDN]/[PGUP] and/or [↑]/[↓], or equivalent input, to select a desired candidate. The user can commit the selected candidate using [SPACE], or equivalent input. Once committed, the candidate is input to the host application (e.g., Application 220 of FIG. 2) by the IME. For example, if the host application is a word processing application, the committed candidate can be provided to a document. As another example, if the host application is an Internet browser, the committed candidate can by input into any input field of the browser (e.g., displayed dialog box, address bar).

§4.1 Command Extension Mode Examples

In some implementations, a user can provide a simple user input (e.g., the single character "i") to the IME, which generates a list of candidate scripts (i.e., those scripts that have been downloaded and installed on the user's device) that can be selected by the user. By way of example, and using Chinese as an example language, the user input "i" can generate the following list of available command extension scripts:

js 计算模式, rq 当前日期, hh 字符画 . . . <- - - >

The leading "i" initiates the command extension mode (i.e., the i-ext mode) and shows the available i-ext scripts (e.g., js, rq, hh, discussed in further detail below) as a list of candidates. The user can browse the commands using the functional keys, or equivalent input, and can select a candidate script using [SPACE], or equivalent input. For example, the user input i[PGDN], results in the next page of the i-ext command candidate list to be displayed (e.g., sj 当前时间, wb 五笔编码 . . . <- - - >). As another example, the user input i[PGUP], results in the previous page of the i-ext command candidate list to be displayed.

In some implementations, a user can provide a more complex user input (e.g., the single character "i" followed by one or more keystrokes, or other equivalent input) to the IME. For example, the user input "i [SPACE]" results in execution of the "js" command extension to provide the following example input candidates:

[计算模式: 请输入四则运算式, 如 3*(2.5−1.7)+sin(4)]

Specifically, [SPACE] following i initiates the i-ext mode "js," which is the first script listed in the list of available scripts. This can also be achieved by the user providing "ijs" as the user input.

Another example input can include i[↓][SPACE]. This input results in the execution of the "rq" command extension to provide the following example input candidates:

1. 2010-10-10 2. 2010 年 10 日 10 月 3. 2010/10/10

Specifically, [↓] moves the cursor to the second script candidate (e.g., rq), and [SPACE] selects that script candidate for execution. This can also be achieved by the user providing "irq" as the user input. The numerals 1., 2., and 3. are the sequence numbers associated with the candidates. From the input candidate list, the keys [1], [2], or [3] can be used to commit the desired input candidate. Alternatively, [SPACE] can be used to commit the currently highlighted candidate. In other implementations, the user input can be provided as "irq2" to directly result in committing 2009 年 10 月 10.

In this case, the original user input directly indicates that candidate number 2 of the candidate list resulting from the script rq should be committed. This provides a more rapid and efficient manner of committing an input candidate, particularly when the user is already aware of the candidates that would have been displayed.

The user can provide a more complex input including one that identifies a desired script and a desired candidate to be processed by the script. For example, the user input "ijs3+2*sin(10)" initiates the i-ext mode, identifies js as the desired script, and 3+2*sin(10) as the argument to be processed by the script. Consequently, the argument is processed by the script to generate and display the following example output:

1. 9119577782213

In this case, only one result is returned, and no candidate sequence number is provided. Upon a pre-specified, subsequent keystroke (e.g., [SPACE]), the displayed result is committed, and is provided as input to the application.

Another example input can include "inh1587" resulting in the following example input candidate list:

a. 公元 1587 年 b. 万历 15 年 c. 万历十五年

Accordingly, for mapping functions that require a numeric argument (e.g., [0-9]+) the selected script instructs the script engine to use sequence letters (e.g., a, b, c, . . . ) for the displayed input candidate list and as candidate selection or committing keys. This information can be provided by metadata of the script function.

FIG. 6A illustrates an example extension corresponding to the command extension mode, and FIG. 6B illustrates an example output based on the extension of FIG. 6A. In the code 600 of FIG. 6A, function Compute is the script function implemented by developer. The developer calls ime.register_command to register the command extension. After the command extension is installed by the user, the user can input "ijs[xxxx]" can be typed to evaluate an arithmetic expression, [xxxx], and the results displayed. In the example of FIG. 6B, the user input includes:

i js 380.22* (sin(7.2)+cos(8))

with the arithmetic expression including 380.22*(sin(7.2)+cos(8)), and the script resulting in the example candidate list 602:

输入表达式, 例如 3*log(4+2), 246.44637233801 that is generated based on the script of FIG. 6A. In some implementations, the extension can be registered as a trigger extension, discussed in further detail herein, in which case the developer calls ime.register_trigger.

§4.2 Trigger Extension Mode

As discussed above, the trigger extension mode is initiated when the user input and/or a candidate matches a pre-registered trigger string. Using Chinese and English as example languages, the Chinese word "shijian" can be translated to English as "time." The user can input "shijian" to a Pinyin IME, resulting in the following example candidate list generated by the IME engine:

1. 时间 2. 事件 3. 实践 4. 此间 5. 是件

If, however, "shijian" is a pre-registered trigger string, the IME engine provides the user input to the IME extension framework, which processes a corresponding script to provide one or more additional candidates. For example, the corresponding script can return the current time (e.g., 12:00) as a candidate. The one or more candidates generated by the IME extension framework are provided to the IME engine, which combines the candidates to provide the following example candidate list:

1. 时间 2. 事件 3. 实践 4. 此间 5. 12:00

In the above candidate list, the extension candidate (i.e., the candidate provided by the IME extension framework) is inserted to the last position of the first candidate list page.

In some implementations, the trigger extension mode can be initiated based on a candidate generated by the IME engine. For example, the user input "shijian" would normally result in the following example candidate list being generated by the IME engine:

1. 时间 2. 事件 3. 实践 4. 此间 5. 是件 as discussed above. However, if the IME engine recognizes that a candidate matches a pre-registered trigger string, the IME engine can provide that candidate to the IME extension framework to generate one or more additional candidates. By way of example, 时间 (i.e., the first candidate of the example candidate list above) can be provided as a pre-registered trigger string. Consequently, the IME engine provides 时间 to the IME extension framework, which processes 时间 based on a designated script to generate an extension candidate (e.g., 12:00). The extension candidate is provided to the IME engine, which generates a final, or revised candidate list for display to the user. An example revised candidate list can include:

1. 时间 2. 12:00 3. 事件 4. 实践 5. 此间

Accordingly, if the trigger extension mode is initiated based on a particular candidate of the IME engine, the extension candidate is inserted next to the triggering candidate.

In some implementations, the trigger extension mode can be initiated by the user input using a prefix and/or suffix match. A wild (e.g., "!" or "*") can be used to define prefix/suffix matching when registering a trigger extension. By way of non-limiting example, a trigger extension "bm*" can be registered as a raiser input trigger string. Any user input starting with "bm" will be recognized by the IME engine as matching the trigger string. An example user input can include "bmabcd". In response to the user input, the IME engine can generate a candidate list including a first set of candidates. An example candidate list generated by the IME engine can include:

1. 宝乃乔驰的 2. 编码 3. 爸妈 4. 宝马 5. 白马

However, because "bm*" is registered as a trigger string, the IME extension framework also processes the user input to generate an extension candidate list including a second set of candidates. An example candidate list generated by the IME extension framework can include:

囚

Accordingly, a single candidate is provided in the second set of candidates. The extension candidate list of the IME extension framework can be provided to the IME engine, which combines the candidate lists to provide a revised candidate list. An example revised candidate list can include:

1. 宝乃乔驰的 2. 编码 3. 爸妈 4. 宝马 5. 囚

Implementations of the disclosure and all of the functional operations described in this specification can be implemented in digital electronic circuitry, or in computer software, firmware, or hardware, including the structures disclosed in this specification and their structural equivalents, or in combinations of one or more of them. Implementations of the disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the disclosure, or any combination of one or more such back end, middleware, or front end components.

The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations of the present disclosure have been described. Nevertheless, it will be understood that various modifications may be made without departing from the spirit and scope of the present disclosure. Accordingly, other implementations are within the scope of the following claims.

The invention claimed is:

1. A computer-implemented method, comprising:
    receiving a user input into a user interface of an input method editor (IME);
    determining, based on the user input, whether to process the user input with a script engine;
    when the user input indicates that the user input is to be processed with the script engine:
        providing the user input to the script engine,
        selecting a script from a plurality of scripts electronically stored in a script repository,
        processing the user input through the script using the script engine to generate one or more candidates, and
        providing the one or more candidates to an IME engine;

when the user input indicates that the user input is not to be processed with the script engine:
  providing the user input to the IME engine, and
  processing the user input with the IME engine to generate the one or more candidates; and
receiving an extension mode input indicating operation of the IME in an extension mode,
operating the IME in the extension mode in response to receiving the extension mode input, and
providing all user input to the script engine when operating in the extension mode.

2. The computer-implemented method of claim 1, further comprising instantiating a sandbox process, the script engine being executed within the sandbox process.

3. The computer-implemented method of claim 1, wherein the IME engine communicates with the script engine using interprocess communication.

4. The computer-implemented method of claim 3, further comprising executing an IPC server within a sandbox process, the IPC server enabling communication between the IME engine and the script engine.

5. The computer-implemented method of claim 1, wherein a sandbox process restricts functionality of the script engine.

6. The computer-implemented method of claim 1, wherein the user input comprises an input sequence that identifies the script and an input to be processed by the script.

7. The computer-implemented method of claim 1, further comprising:
  comparing the user input to one or more trigger strings;
  determining that the user input matches one of the one or more trigger strings; and
  selecting the script based on the one of the one or more trigger strings.

8. The computer-implemented method of claim 1, wherein the user input comprises the extension mode input.

9. The computer-implemented method of claim 1, wherein processing the user input through the script comprises:
  establishing a network connection with a web-based service;
  providing at least a portion of the user input to the web-based service; and
  receiving a response from the web-based service, the response having been generated based on the at least a portion of the user input, and the one or more candidates comprising the response.

10. The computer-implemented method of claim 9, wherein the web-based service comprises at least one of a map service, a search service and a translation service.

11. The computer-implemented method of claim 1, further comprising:
  generating a first candidate list comprising a first set of candidates;
  generating a second candidate list comprising a second set of candidates, the second set of candidates comprising the one or more candidates generated using the script engine;
  combining at least a portion of the first set of candidates and at least a portion of the second set of candidates to provide a third candidate list; and
  displaying the third candidate list on the user device.

12. The computer-implemented method of claim 1, wherein the IME engine processes the one or more candidates for display on the user interface.

13. The computer-implemented method of claim 1, further comprising:
  receiving second user input indicating a selection of one of the one or more candidates; and
  inputting the one of the one or more candidates to an application executed on a user device.

14. The computer-implemented method of claim 13, wherein the application includes one of a word processing application, a text editing application, a spreadsheet application, an email application, a presentation application, and a web browser.

15. The computer-implemented method of claim 1, wherein each script electronically stored in the script repository comprises one or more routines selected from a plurality of approved routines.

16. The computer-implemented method of claim 1, further comprising identifying a script language of the script, wherein the script engine instantiates a runtime corresponding to the script language for processing the user input through the script.

17. The computer-implemented method of claim 1, wherein the user input is provided in a first language.

18. The computer-implemented method of claim 17, wherein the one or more candidates are provided in the first language.

19. The computer-implemented method of claim 17, wherein the one or more candidates are provided in a second language.

20. The computer-implemented method of claim 17, wherein the one or more candidates are provided in a combination of the first language and a second language.

21. The computer-implemented method of claim 17, wherein the one or more candidates include one or more symbols.

22. The computer-implemented method of claim 1, further comprising:
  receiving input;
  generating a list of available scripts electronically stored in a central registry in response to the input, the list of available scripts including the script;
  receiving a second input indicating a selection of the script;
  retrieving the script from the central registry in response to the second input; and
  storing the script in the script repository.

23. A computer-implemented method, comprising:
  receiving a user input into a user interface of an input method editor (IME);
  determining, based on the user input, whether to process the user input with a script engine;
  when the user input indicates that the user input is to be processed with the script engine:
    providing the user input to the script engine,
    selecting a script from a plurality of scripts electronically stored in a script repository,
    establishing a network connection with a web-based service based on instructions provided in the script,
    providing at least a portion of the user input to the web-based service,
    receiving a response from the web-based service, and
    providing the response to an IME engine to display the response to a user;
  when the user input indicates that the user input is not to be processed with the script engine:
    providing the user input to the IME engine, and
    processing the user input with the IME engine to generate one or more candidates; and
  receiving an extension mode input indicating operation of the IME in an extension mode,
  operating the IME in the extension mode in response to receiving the extension mode input, and providing all user input to the script engine when operating in the extension mode.

24. The computer-implemented method of claim 23, wherein the web-based service comprises at least one of a map service, a search service and a translation service.

25. The computer-implemented method of claim 24, wherein the at least a portion of the user input is provided to the map service, and the response is generated by the map service and includes a user selectable hyperlink.

26. The computer-implemented method of claim 24, wherein the at least a portion of the user input is provided to the search service as a search term, and the response is generated by the search service and includes one or more search results generated by the search service based on the search term.

27. The computer-implemented method of claim 24, wherein the at least a portion of the user input is provided to the translation service and is provided in a first language, and the response is generated by the translation service and is provided in a second language.

28. A system, comprising:
a display;
a computer-readable storage medium comprising a script repository for electronically storing one or more scripts; and
one or more processors that execute an input method editor (IME), that receive a user input to the IME, that determine, based on the user input, whether to process the user input with a script engine, that:
when the user input indicates that the user input is to be processed with the script engine:
provide the user input to the script engine, select the script from the script repository, process the user input through the script using the script engine to generate one or more candidates, and provide the one or more candidates to be displayed on the display;
when the user input indicates that the user input is not to be processed with the script engine:
provide the user input to the IME engine, and process the user input with the IME engine to generate one or more candidates, and provide the one or more candidates to be displayed on the display; and
receive an extension mode input indicating operation of the IME in an extension mode, operate the IME in the extension mode in response to receiving the extension mode input, and provide all user input to the script engine when operating in the extension mode.

29. The system of claim 28, wherein the one or more processors instantiate a sandbox process, the script engine being executed within the sandbox process.

30. The system of claim 29, wherein a sandbox process restricts functionality of the script engine.

31. The system of claim 28, wherein an IME engine communicates with the script engine using inter-process communication.

32. The system of claim 31, wherein the one or more processors execute an IPC server within a sandbox process, the IPC server enabling communication between the IME engine and the script engine.

33. The system of claim 28, wherein the user input comprises an input sequence that identifies the script and an input to be processed by the script.

34. The system of claim 28, wherein the one or more processors compare the user input to one or more trigger strings, determine that the user input matches one of the one or more trigger strings, and select the script based on the one of the one or more trigger strings.

35. The system of claim 28, wherein the one or more processors process the user input through the script by:
establishing a network connection with a web-based service;
providing at least a portion of the user input to the web-based service; and
receiving a response from the web-based service, the response having been generated based on the at least a portion of the user input, and the one or more candidates comprising the response.

36. The system of claim 35, wherein the web-based service comprises at least one of a map service, a search service and a translation service.

37. The system of claim 28, wherein the one or more processors generate a first candidate list comprising a first set of candidates, generate a second candidate list comprising a second set of candidates, the second set of candidates comprising the one or more candidates generated using the script engine, combine at least a portion of the first set of candidates and at least a portion of the second set of candidates to provide a third candidate list, and display the third candidate list on the user device.

38. The system of claim 28, wherein the IME engine processes the one or more candidates for display on the user interface.

39. The system of claim 28, wherein the one or more processors receive second user input indicating a selection of one of the one or more candidates, and input the one of the one or more candidates to an application executed on a user device.

40. The system of claim 39, wherein the application includes one of a word processing application, a text editing application, a spreadsheet application, an email application, a presentation application, and a web browser.

41. The system of claim 28, wherein each script electronically stored in the script repository comprises one or more routines selected from a plurality of approved routines.

42. The system of claim 28, wherein the one or more processors identify a script language of the script, wherein the script engine instantiates a runtime corresponding to the script language for processing the user input through the script.

43. The system of claim 28, wherein the user input is provided in a first language.

44. The system of claim 43, wherein the one or more candidates are provided in the first language.

45. The system of claim 43, wherein the one or more candidates are provided in a second language.

46. The system of claim 43, wherein the one or more candidates are provided in a combination of the first language and a second language.

47. The system of claim 43, wherein the one or more candidates include one or more symbols.

48. The system of claim 28, wherein the one or more processors receive input, generate a list of available scripts electronically stored in a central registry in response to the input, the list of available scripts including the script, receiving a second input indicating a selection of the script, retrieving the script from the central registry in response to the second input, and storing the script in the script repository.

49. The system of claim 28, wherein the user input comprises the extension mode input.

* * * * *